Aug. 2, 1960 F. H. HANLEY ET AL 2,947,803

CLOCK CONTROLLED AUTOMATIC RECYCLING SWITCHING CIRCUIT

Filed April 24, 1957 3 Sheets-Sheet 1

INVENTORS F. H. HANLEY
C. J. VOTAW
BY
John E. Cassidy
ATTORNEY

CLOCK CONTROLLED AUTOMATIC RECYCLING SWITCHING CIRCUIT

Filed April 24, 1957 3 Sheets-Sheet 2

INVENTORS F. H. HANLEY
C. J. VOTAW
BY
John E. Cassidy
ATTORNEY

CLOCK CONTROLLED AUTOMATIC RECYCLING SWITCHING CIRCUIT

Filed April 24, 1957 3 Sheets-Sheet 3

INVENTORS F. H. HANLEY
C. J. VOTAW
BY
John E. Cassidy
ATTORNEY

United States Patent Office 2,947,803

Patented Aug. 2, 1960

2,947,803

CLOCK CONTROLLED AUTOMATIC RECYCLING SWITCHING CIRCUIT

Frank H. Hanley, Butler, and Clarence J. Votaw, Bergenfield, N.J., assignors to American Telephone and Telegraph Company, a corporation of New York Filed Apr. 24, 1957, Ser. No. 654,923

7 Claims. (Cl. 178—3)

Figure 1:
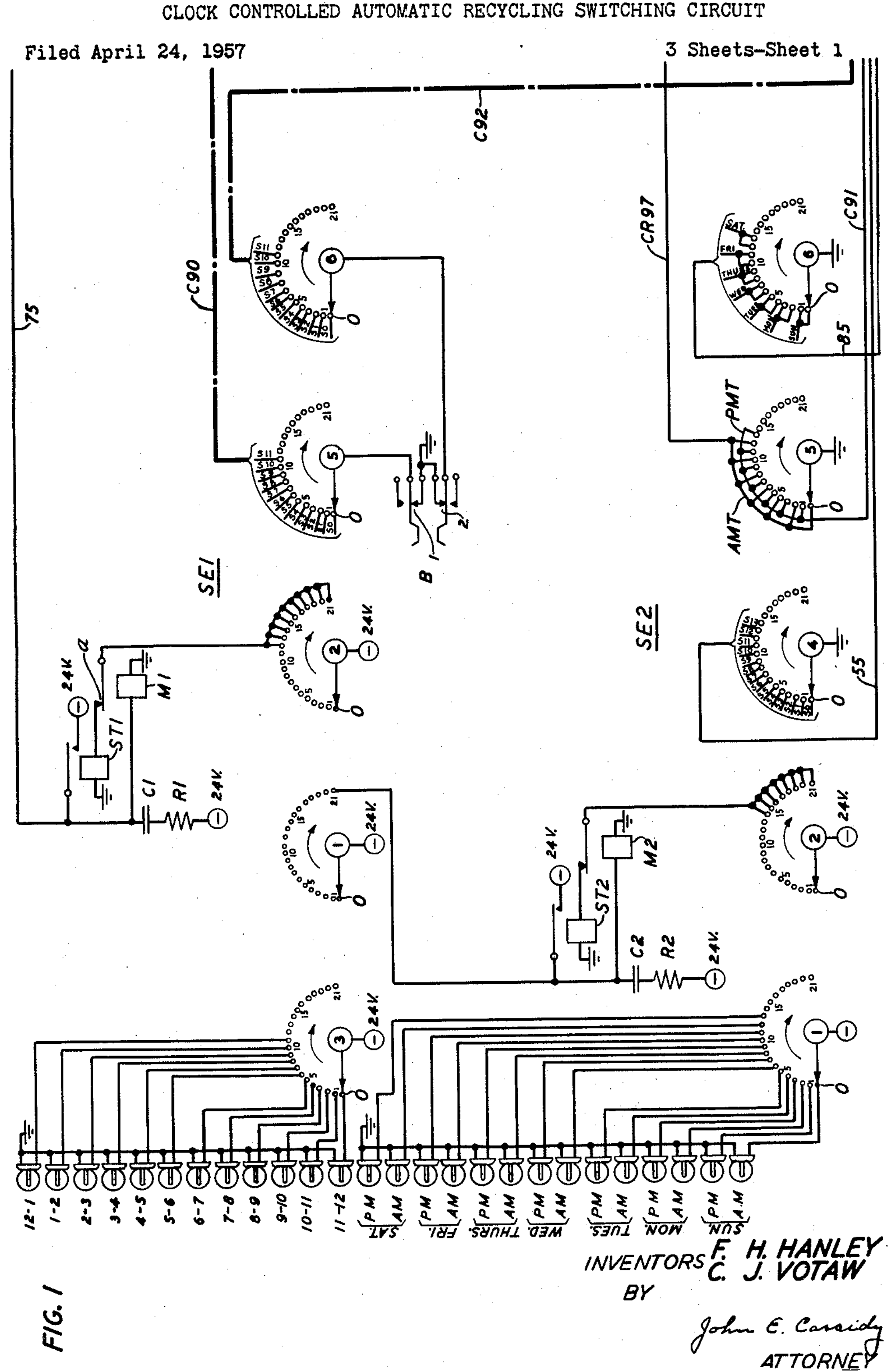

This invention pertains to selecting systems, for employment, for instance, in selecting public utility circuits or other facilities for periods of usage, or for measuring, testing, recording, or other purposes, on a periodic or on an aperiodic basis.

An object of the invention is the improvement of selecting circuits.

Another object of the invention is the improvement of selecting circuits for selecting other circuits or devices on a periodic or on an aperiodic basis.

It is considered that the present invention will find wide use in systems, such as in communication systems, having subscriber circuits which are to be connected into and disconnected from communication networks at any required and stipulated times.

In certain types of communication service, as well as in other utility services, facilities are not required to be made available continuously to all customers. Certain customers require service at regular times such as during the working hours of every working day of the week. Others require service at certain hours of certain days of the week only. For instance, in what is known in telegraphy as private line service, certain customers, such as newspaper companies and brokerage companies, as well as certain large industrial corporations, have need of telegraph facilities which interconnect offices in various cities in the country into unitary private networks. In certain cases, these networks once established remain intact for relatively long periods, such as for months, for instance. In other cases the networks for required to be operable only during the period of the working day, from Monday to Friday, for instance. Other systems are required to be established for operation only during shorter intervals such as during the working hours of two or three days in a week. There are yet others which require service for only one or two hours on certain days of the week. And, in general, in order to meet the requirements of a wide diversity of customers' needs in a modern teletypewriter central office, for instance, in a large city having thousands of customers connected thereto, it is necessary to perform a considerable amount of switching of the telegraph facilities if the customers are not to be unduly charged for unrequired service and if the telegraph facilities in the office are to be advantageously employed. At the present time the switching necessary to achieve the foregoing in the teletypewriter switching center is all performed manually. Not only does this require a relatively large number of skilled employees, but due to mental lapses there is always a certain incidence of error.

In one of its most important aspects, the present circuit is an arrangement for performing the switching functions required to provide service for different customers at different times by electromechanical means. In the present system, a timing device actuates selecting elements in such manner that any of thousands of subscribers' lines connected to a teletypewriter central office, for instance, can be automatically switched into service at any desired time of the day or night. Further, the circuits so switched may remain connected for any desired interval, such as for days, weeks, or indefinitely, and may be automatically disconnected after any desired interval without human intervention. Thus, not only will the skilled personnel heretofore required to perform this function be made available for other service, but the errors due to human lapses will be eliminated.

It will be obvious from a description of the invention which follows that its use is not limited to any particular application. There are many types of service usage as well as systems of testing and recording in which the present circuit may be advantageously employed.

The invention may be understood from the following description when read with reference to the associated drawings which taken together disclose a preferred embodiment in which the invention is presently incorporated. It is to be understood that the invention may be incorporated in other embodiments which will be readily suggested to those skilled in the art from a consideration of the present disclosure.

Figure 2:
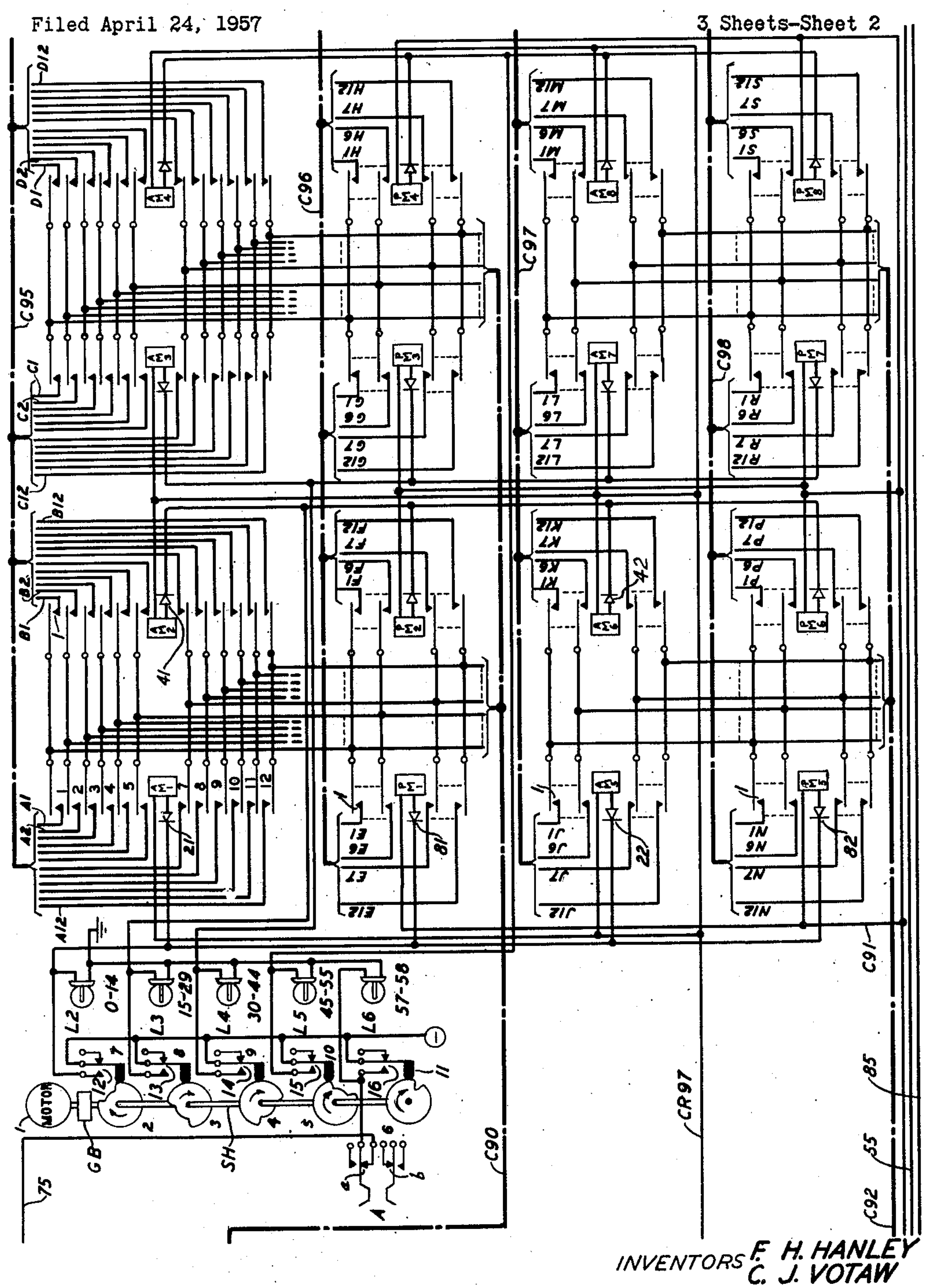
Figures 3, 4:
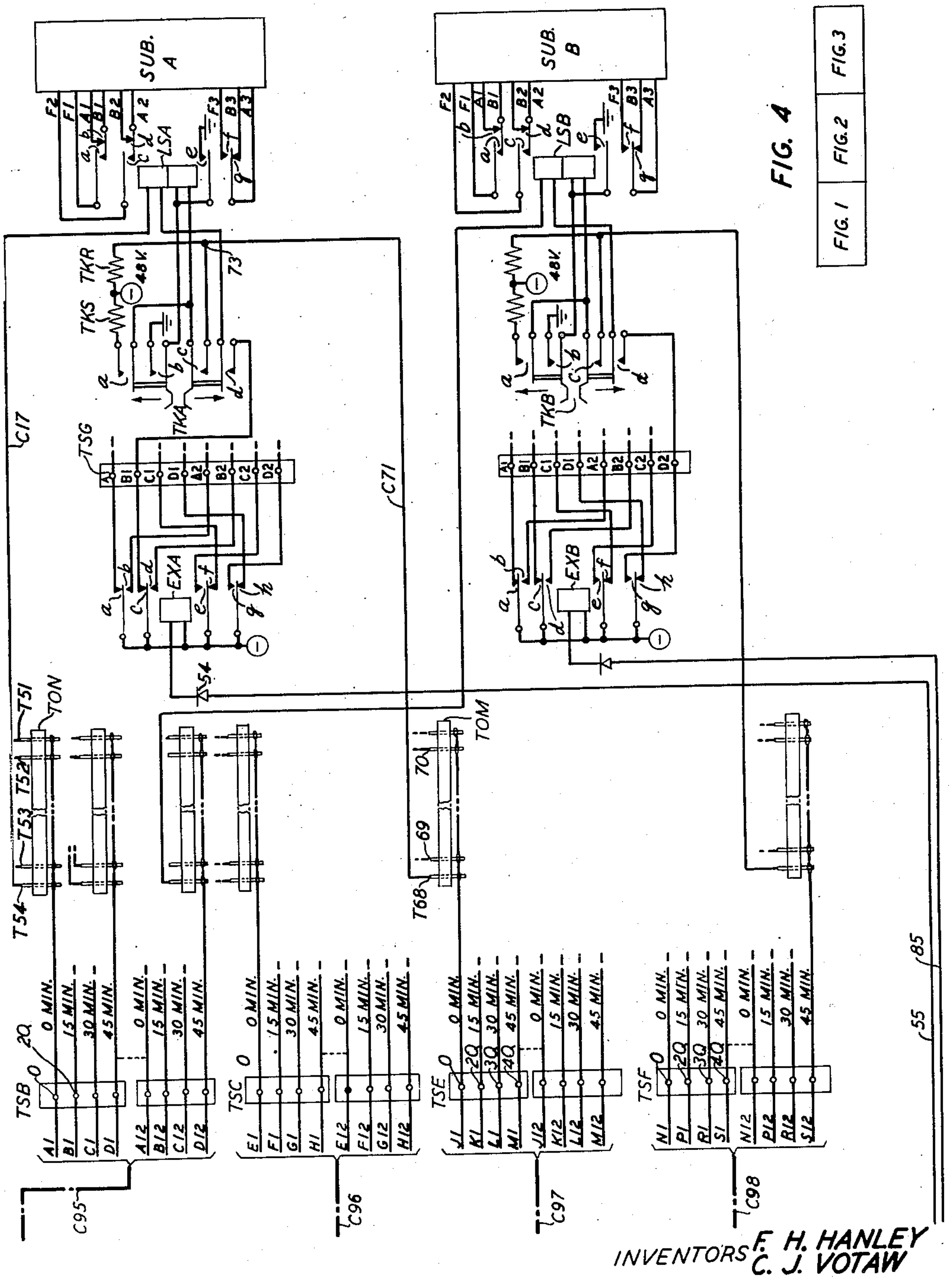

In the drawings:

Fig. 1, Fig. 2 and Fig. 3 taken together and disposed as in Fig. 4 show the unitary circuit of the present invention.

Fig. 1 shows two time-interval-controlling selectors and a group of signaling lamps, these latter for checking the time selections effected. Fig. 2 shows a time controlled motor together with a set of cams and a set of switches and a group of relays jointly controlled by the cams and the selectors in Fig. 1. Fig. 3 shows the output circuit for the selecting device together with relays controlled by the selector in Fig. 1 for determining the periods of selection and release of the customers' facilities, which latter are indicated by rectangles at the extreme right in Fig. 3.

Before proceeding with the detailed description of the invention, it will first be described generally as an aid in understanding the detailed description. Refer now to Figs. 1, 2 and 3 disposed as in Fig. 4.

A continuously rotating synchronous motor, shown at the upper left in Fig. 2, is used as a time control. The motor drives a set of five cams each of which controls an individual contact. An individual one of the four upper cams and contacts is actuated at the beginning of each of the successive quarter-hour intervals in each hour of the day and night. The motor once started operates continuously. Each contact in turn in cooperation with selector bank 5 of selector SE2 operates an individual group of the relays shown in Fig. 2. There are four vertical rows of relays in Fig. 2. In each vertical row there are four relays consisting of two sets of two relays each. One of these two sets in the left-hand vertical row is designated AM1 and AM5 and the other set is designated PM1 and PM5. The relays designated AM1 and AM5 are operated at the beginning of the first quarter-hour inetrval of each hour of the period from midnight to noon and the relays designated PM1 and PM5 are operated at the beginning of the first quarter-hour interval of each hour of the period from noon to midnight. The relays in the second, third, and fourth vertical rows in Fig. 2 are operated, in a manner similar to that described for the relays in the first vertical row, at the beginning of the second, third and fourth quarter-hour interval, respectively, of each hour of the a.m. and p.m. period. The function of relays AM1, AM2, AM3 and AM4 is to control the connection of all customers' lines or facilities which are required to be connected into service at the beginning of each successive quarter-hour interval of any a.m. hour and the function of relays AM5, AM6, AM7 and AM8 is to control the disconnection of those lines or facilities which are required to be disconnected at these times. Relays PM1, PM2, PM3 and PM4 and relays PM5, PM6, PM7 and PM8 perform functions corresponding to those of their AM—counterparts during the interval from noon to midnight. Although there is but one relay shown in each vertical row which performs any particular function at any quarter-hour interval, it is to be understood that as many such relays will be employed at any time as are required to handle the load at that time. This will be made more clear hereinafter.

The bottom cam of those controlled by the motor in Fig. 2 operates once, at the end of each hour, and controls the operation of selector SE1 in Fig. 1 through the intermediary of magnet M1 and relay ST1 which function as a reciprocating circuit in a manner to be explained hereinafter. Selector SE1 in turn controls the operation of selector SE2 through another reciprocating circuit, comprising magnet M2 and relay ST2. Selectors SE1 and SE2 each has five contact banks. Each bank has 22 contacts designated 0 to 21, and an individual rotatable contact arm. When either selector is actuated, all arms on the particular selector are rotated in unison, in a clockwise direction, under control of the respective reciprocating circuit of the selector to engage each of the contacts of their individual banks successively. The first 12 contacts on bank 5 of selector SE1, contacts 0 to 11, inclusive, are assigned individually to the 12 hours of the a.m. period. Each supplies ground for one of the 12 hours of this period through one of the 12 contacts of relays AM1 and AM5, AM2 and AM6, AM3 and AM7 and AM4 and AM8, at the beginning of the first, second, third and fourth quarter hours in an hour respectively, to the windings of relays such as relay LSA in Fig. 3, which relays control the connection and disconnection of the subscribers' lines and facilities. The corresponding 12 contacts of bank 6 of selector SE1 are assigned individually to the 12 hours of the p.m. period. These contacts are connected through the PM— relays in a corresponding manner to perform corresponding functions during the p.m. period.

Contacts 12 to 21 of bank 2 of selector SE1 and strapped together, in parallel and, when the first of these terminals is engaged by the rotatable arm of bank 2, which will be immediately after the end of the last hour of each a.m. or p.m. period, all of the arms of selector SE1 will be actuated in unison, and in rapid succession, over their respective terminals 12 to 21 and then to engage their respective terminals 0, to start a new a.m. or p.m. cycle, under control of the reciprocating circuit of selector SE1 comprising magnet M1 and relay ST1.

Bank 3 of selector SE1 is a signaling bank. Each of the first 12 terminals in this band is employed to light a lamp when the rotatable arm of bank 3 engages these terminals. The lamps are designated to correspond with the hourly intervals in each 12 hour period.

When the rotatable arm of bank 1 of selector SE1 engages its terminal 21, which is during the time when all of the selector arms are being rotated rapidly, during a short interval between the 12 hour cycles, battery will be supplied through the rotatable arm and terminal 21 of bank 1 of selector SE1 to energize magnet M2 of selector SE2. The rotatable arms of selector SE2 will all be in engagement with their respective terminals 0 at the beginning of each week's cycle, for reasons to be made clear hereinafter. Selector SE2 is arranged to be advanced one terminal during each 12 hour period and 14 terminals during each weekly cycle. Whenever selector SE1 has finished stepping through its 12 steps for a 12 hour cycle, battery passed through terminal 21 of bank 1 thereof and applied to magnet M2 of selector SE2 causes all of the arms of selector SE2 to step to an adjacent terminal. This will happen 14 times in each week.

The first 14 terminals of bank 5 of selector SE2 are arranged so that each alternate terminal is connected into one of two parallel groups. The seven even numbered terminals are connected into one parallel group AMT, and the seven odd numbered terminals are connected into another parallel group PMT. The even numbered or AMT terminal group is connected to a common terminal of each of the windings of the AM– relays in Fig. 2, in parallel. The odd numbered or PMT terminal group is connected to a common terminal of each of the PM– relays in Fig. 2, in parallel. Thus, at the beginning of each quarter-hour interval from midnight to noon of any one of the seven days of the week, the upper four cams will successively operate each of the AM– relays in proper time sequence in cooperation with a circuit extending through the windings of the AM– relays and an even numbered terminal of bank 5 of selector SE2. During the interval from noon to midnight of any one of the seven days of the week the PM– relays will be operated in proper time sequence under control of the cams in cooperation with a circuit extending through the windings of the PM– relays and an odd numbered contact of the same selector bank.

Bank 1 of selector SE2 is arranged so that its first 14 terminals energize an individual one of 14 lamps, one for the a.m. and one for the p.m. period of each day of the week. Bank 2 of selector SE2 has its terminals 14 to 21 connected in parallel to an individual reciprocating circuit, comprising magnet M2 and relay ST2, associated with selector SE2, so as to actuate all of the arms of selector SE2 in unison and in rapid succession from terminals 14 to 21 and then to terminals 0 of their respective banks.

Bank 4 of selector SE2 is arranged so that its terminals may be connected to the winding of any of a group of relays such as relay EXA in Fig. 3, which determines the individual days of the week when particular customers may be given service. Bank 6 of selector SE2 is used to control relays such as relays EXB in Fig. 3 in such manner that service may be given to particular customers on specified groups of days in the week.

When any of the relays in Fig. 2 is operated, for instance, relay AM1, for the first quarter hour of any hour of the a.m. interval, ground will be supplied from key B1 through the rotatable arm and some one of the first 12 contacts of bank 5 of selector SE1 and a corresponding one of terminals 1 to 12 of relay AM1, depending upon the number of the hour, to a particular terminal of terminal strip TSB in Fig. 3. In order to simplify the drawing, the number of terminal strip rows required to accommodate all of the conductors extending from the relays in Fig. 2 have not been shown in Fig. 3. There are 12 conductors, one for each hour, extending from the contacts of each of the 4 relays in each row in Fig. 2, or a total of 48 conductors to the terminal strips in Fig. 3. The 12 contacts and conductors for each of the relays on the top horizontal row are all shown in Fig. 2 and are designated A1 to A12, B1 to B12, C1 to C12 and D1 to D12. Only four of the 12 contacts and conductors for each of the four relays in the second, third and fourth horizontal row from the top are shown in detail. These are the first, sixth, seventh and twelfth contacts and conductors. These four conductors in the second row are designated E–, F–, G– and H–, in the third row they are designated J–, K–, L– and M– and in the bottom row N–, P–, R– and S–. The 48 conductors from each horizontal row are assumed to extend through the individual cable, cable C95, C96, C97 or C98, to an individual terminal strip in Fig. 3 for each horizontal row of relays in Fig. 2. Each of these terminal strips is assumed to have 48 terminals arranged in 12 rows of four each. Four terminal strips are thus required, terminal strips TSB, TSC, TSE and TSF, of which the first and last rows, only, of the 12 rows on each are shown in Fig. 3.

In order to care for several thousand customers' circuits in a particular central office, each one of the terminals on each of terminal strips TSB, TSC, TSE and TSF will be connected in parallel to as many individual terminals and conductors as may be needed to accommodate all of the customers' circuits which are required to be connected into service or disconnected from service at the beginning of any 15 minute interval of the day or night. Thus, for instance, the top or terminal 0 of terminal strip TSB, which controls the connection of all circuits required to be connected into service at the beginning of the first quarter-hour interval after mignight, is connected through conductor 0–Min. to a number of terminals on one side of a row of terminals on an individual terminal strip TON, in parallel. Each of the terminals on terminal strip TON, such as terminal T54, will be connected through an individual conductor, such as conductor C17, to the winding of an individual relay, such as relay LSA, which controls the connection into service of a particular customer's circuit, represented by the rectangle Sub. A. It is to be understood that there will be an individual relay, such as relay LSA, for every customer's facility which is to be controlled automatically by the present timing circuit.

There is an individual time and maintenance control key, such as key TKA, associated with each relay LSA. When key TKA is in the normal unoperated position shown, the circuit through the windings of relay LSA is open. When the *c* and *d* contacts of key TKA are closed, the circuit through the top winding of relay LSA is extended to the contacts of a relay such as relay EXA. Relay EXA is intended to serve a large number of individual relays such as relay LSA. When relay EXA is in one position, battery may be supplied to relay LSA and when relay EXA is in another position battery may be disconnected from relay LSA. The winding of relay EXA and the winding of a corresponding relay EXB connect to terminals on banks 4 and 6 respectively of selector SE2. It was pointed out in the foregoing that selector SE2 is controlled so that its rotatable arms are stepped every 12 hours or 14 times during a week. By selectively connecting the windings of relays such as relays EXA and relay EXB to the contacts of banks 4 and 6 of selector SE2, relays, such as relay EXA and relay EXB may be placed in the operated or unoperated condition for any 12 or 24 hours during the weekly period. This permits operation or non-operation of relays such as relay LSA or LSB, during such periods within these 12 hour intervals as is determined by the relays in Fig. 2 and selector SE1 in Fig. 1. Relays, such as relay LSA upon being operated are automatically locked through their own contacts, such as contact *e*. The relay remains locked until it is released at the beginning of some later fifteen-minute interval of some hour, as determined by the manner in which it is connected to relays AM5, AM6, AM7 or AM8, if the disconnection is to be effected during the a.m. interval or to relays PM5, PM6, PM7 or PM8 if the disconnection is to be effected during the p.m. period.

The relay, such as relay EXA, as shown in the drawing, is controlled by bank 4 of selector SE2. The wiring interconnecting the terminals of bank 4 and the winding of relay EXA may be arranged for instance to operate relay EXA on Saturday and Sunday only. On these days, relays such as relays LSA connected to back contacts of relay EXA would be prevented from operating and the subscriber's circuit associated with such relays LSA will not be connected into service. Relay EXB is controlled by bank 6 of selector SE2. If, for instance, the circuit controlled by relay LSB is to be connected into service during only one day of the week, its controlling relay EXB may be connected to a particular terminal on bank 6 of selector SE2 which terminal receives the required operating condition through its rotatable arm on this particular day only. If the subscriber's circuit individual to the relay such as relay LSB, is to be operated during a number of days of each week, its controlling relay, such as relay EXB, will be connected to a corresponding number of terminals in selected positions on bank 6 of selector SE2 in parallel, to which terminals the required operating condition is connected on the particular days required. It is to be understood that there may be as many banks, such as bank 6, and relays, such as relays EXA and EXB, arranged in as many manners as may be required, to afford connection and disconnection of all automatically timed controlled subscribers' circuits in the central office on the days and at the times desired by the customer.

The operation of the circuit will now be described in detail. The circuit, as explained, operates continuously. It goes through a full cycle of operation in one week, which week may be considered to be subdivided into periods of 24 hour days, 12 hour half days, single hours and quarter hours. It is to be understood that these intervals may be changed as desired by a proper choice of motor speed and of the number of cams and their cuttings and by a choice of the wiring of selectors SE1 and SE2, as will become apparent from this detailed description.

At the start of a week's cycle of operation, each of the rotatable arms of selectors SE1 and SE2 is in engagement with terminal 0 of its respective bank, for reasons which will become clear hereinafter. All of the relays in Fig. 2 are in the released condition, as shown. It will be assumed that key TKA is actuated to close its contacts *c* and *d*. It will be assumed also that relay EXA is in the released condition as shown. Magnets M1 and M2 in Fig. 1 and relays ST1 and ST2 in Fig. 1 are in the released condition as shown. Key B in Fig. 1 is in the position shown. Lamps 11—12 and Sun.–AM in Fig. 1 are lighted.

At the upper left in Fig. 2 is shown a synchronous motor 1 which is coupled through a gear box GB to a shaft SH, which shaft is rotated clockwise through one revolution in an hour. On the shaft SH there are mounted five cams, cams 2, 3, 4, 5 and 6, which cams actuate individual followers 7, 8, 9, 10 and 11, respectively, to control contacts 12, 13, 14, 15 and 16, respectively. The followers are each spring tensioned toward the left, as shown in Fig. 2. Each follower is momentarily engaged with the raised portion of the periphery of its respective cam, in which position all of the contacts are opened. It will be assumed that a week's cycle starts immediately after midnight on Saturday night. At this time cam 2 has been rotated into such position that its follower 7 engages a depressed portion of its perpihery, closing contact 12. A circuit is thereby established which may be traced from a source of negative battery through contact 12, diodes 21 and 22, in parallel, which diodes are poled to afford low resistance to current from a negative source, windings of relays AM1 and AM5, in parallel, conductor CR97, terminal 0 and the rotatable arm of bank 5 of selector SE2 to ground operating relays AM1 and AM5. With relay AM1 operated a circuit may be traced from ground through terminal 1 of key B1, rotatable arm and contact 0 of bank 5 of selector SE1, one of 12 conductors in cable C90, contact 1 of relay AM1, conductor A1, which is one of 48 conductors in cable C95, terminal 0 of terminal strip TSB, and conductor 0–Min. to a group of contacts, in parallel, on the lower side of terminal strip TON. From one of these terminals, terminal T54, for instance, a path extends through conductor C17, top winding of relay LSA, contact *d* of key TKA, terminal B1 of terminal strip TSG and contact *c* of relay EXA to battery operating relay LSA. Relay LSA, when operated, locks over a circuit which may be traced from ground through contact *e* and the bottom winding of relay LSA, contact *c* of key TKA and resistor TKR to battery. Attention is called to the fact that conductor 0–Min. will ordinarily be connected in multiple to a large number of terminals on terminal strip TON such as 20 or more, for instance, only four of which are shown. Conductor C17, which interconnects terminal T54, and the winding of relay LSA, controls a single relay. It is to be understood, however, that this single relay LSA typifies a large number of relays, such as 20 or more, for instance, in the communication office, the windings of which are connected individually to terminals such as terminals T51, T52, T53 and T54. The operation of each of these relays, such as relay LSA, for one preferred embodiment, may connect an individual telegraph subscriber station circuit into a so-called private line telegraph or teletypewriter network. It is to be understood also that each of the relays such as relay LSA may be used to control other circuits or other mechanisms to perform any desired function. A circuit may be traced from negative battery through the winding of relay EXA, dry rectifier 54, which is poled to present low resistance to current from a source of negative potential, conductor 55, and any desired terminal of the terminals of bank 4 of selector SE2. When the associated rotatable arm of bank 4 engages this terminal, the circuit will be extended to ground operating relay EXA. In this instance all relays such as relay LSA, the windings of which are connected to back contacts of relay EXA will be prevented from operating. Other relays corresponding to relay LSA, the windings of which are connected to the front contacts of relay EXA will be permitted to operate.

Attention is called to the fact that any relay such as relay LSA which is operated at any time, may be released at any time thereafter through the control effected by a relay, such as relay AM5. It was pointed out that relay AM5 operated at the same time as did relay AM1. The function of relay AM5 is to unlock any relay required to be unlocked when relay AM5 is operated. It was shown that relays AM1 and AM5 operate in parallel at the beginning of the first fifteen-minute interval after midnight. Relays AM2 and AM6, AM3 and AM7, AM4 and AM8 operate, each pair in parallel, during the second, third and fourth fifteen-minute intervals of each hour from midnight to noon in a manner corresponding to that described for relays AM1 and AM5. Relays PM1 and PM5, PM2 and PM6, relays PM3 and PM7, and relays PM4 and PM8 operate in parallel at the beginning of the first, second, third and fourth fifteen-minute interval of each hour from noon until midnight. The path for the operation of relays PM1 and PM5 may be traced from battery through contact 12, dry rectifiers 81 and 82, windings of relays PM1 and PM5, both in parallel, and conductor C91 to the group of terminals PMT on bank 5 of selector SE2. Each time during the week that the rotatable arm of bank 5 of selector SE2 is in engagement with one of these terminals, while cam contact 12 is closed, relays PM1 and PM5 will be operated. Relay PM1 functions to connect and relay PM5 to disconnect customer lines at such periods.

The manner in which the operation of a relay such as relay AM5 releases any locked relay such as relay LSA will now be explained. For this purpose, it will be assumed that relay LSA is a relay which has been operated for the desired interval and is now to be released. In the previous explanation it was assumed that relay LSA was operated at the beginning of the first fifteen-minute interval after midnight. However, for the present purposes it will be assumed that relay LSA was operated at some other time and locked in the manner described in the foregoing and that it is now to be released.

The operation of relay AM5 will establish a circuit from ground through contact 2 of key B, rotatable arm and contact 0 of bank 6 of selector SE1, through one of the 12 conductors in cable C92, contact 1 of relay AM5, conductor J1 which is one of the 48 conductors in cable C97, terminal 0 of terminal strip TSE, terminal T68 of terminal strip TOM and conductor C71, to junction point 73. Junction point 73 is intermediate contact *c* of key TKA and resistor TKR. It will be recalled that the holding path for the bottom winding of relay LSA extended through contact *c* of key TKA and resistor TKR to battery. Now since ground is supplied to junction point 73, ground is connected to each end of the bottom winding of relay LSA. This shunts the battery normally supplied through resistor TKR and relay LSA releases.

At the start of the second fifteen-minute interval of the hour, cam 3 will control follower 8 to close contact 13. This establishes a circuit which may be traced from a source of negative battery through contact 13, dry rectifiers 41 and 42, windings of relays AM2 and AM6, in parallel, conductor CR97, and contact 0 and the rotatable arm of bank 5 of selector SE2 to ground operating relays AM2 and AM6. The operation of relay AM2 establishes a circuit from ground through contact 1 of key B, rotatable arm and bank terminal 0 of bank 5 of selector SE1, contact 1 of relay AM2, and conductor B1 which is one of 48 conductors in cable C95, to contact 2Q of terminal strip TSB. From this point the circuit is connected in multiple to a number of terminals, which may be twenty terminals, for instance. Each one of these is connected through the winding of an individual relay such as relay LSA in the same manner as described heretofore. These relays will be actuated at the beginning of the second fifteen-minute interval of the first hour following midnight and, upon being operated, will be locked in the same manner as heretofore described.

Cam 4 will be operated at the beginning of the third quarter-hour interval and cam 5 will be operated at the beginning of the last quarter-hour interval of the first hour. Cam 4 will operate relays AM3 and AM7 and cam 5 will operate relays AM4 and AM8. These relays will perform functions corresponding to those described for relays AM1 and AM5. Just before the end of the hour cam 6 actuates follower 11 to close contact 16 and a circuit is established from battery through contact 16, contact *a* of key A, conductor 75, and the winding of magnet M1 to ground energizing magnet M1 of selector SE1. The magnet M1 controls the rotatable arms of the banks of selector SE1. However, the energization of magnet M1 does not cause the arms to rotate at this time since this is effected upon the deenergization of magnet M1. Just at the end of the hour, cam 6 actuates follower 11 to open contact 16 and in response to this magnet M1 is deenergized and all of the rotatable arms of selector SE1 move one step to engage their respective terminals 1.

The timing motor 1 continues to operate and drive cams 2 to 6 inclusive through another cycle during the second hour, which may be, for instance, from 1 a.m. to 2 a.m. on Sunday morning. The stepping of the rotatable arm of bank 5 of selector SE1 will establish a circuit from ground through contact 1 of key B, rotatable arm and contact 1 of bank 5 of selector SE1, a conductor in cable C90, and contact 2 of relay AM1 to conductor A2.

Terminal strip TSB in Fig. 3 may be arranged so that it has 12 rows with four terminals in each row, one row of the terminals for each hour from midnight to noon. Conductors A1, B1, C1 and D1 for the first, second, third and fourth quarter hour of the first hour of this interval may be connected to the top row of the 12 rows of terminals on terminal strip TSB. Similarly the set of four conductors A2, B2, C2 and D2, may be connected to the four terminals of the second row on terminal strip TSB. Each one of the terminals on terminal strip B may be connected in multiple to as many terminals as may be required to control the relays which are to be operated during each fifteen-minute interval of the period from midnight to noon. As cams 3, 4 and 5 are rotated into position to close their respective contacts 13, 14 and 15, relays AM2 and AM6, AM3 and AM7, AM4 and AM8 will be operated in pairs in sequence and at the end of this hour, magnet M1 will again be energized and deenergized to rotate the arms of selector SE1 to the next position.

During the period from midnight Saturday to noon of Sunday, for instance, the motor 1 together with its associated cams 2 through 6, inclusive, will go through 12 cycles, and the arms of selector SE1 will be stepped twelve times. Relays AM1, AM2, AM3 and AM4 will go through 12 cycles as will relays AM5, AM6, AM7 and AM8. During this interval, assuming twenty relays such as relay LSA to be operated during each fifteen-minute interval by each conductor such as conductor A1, for instance, a total of 960 relays such as relay LSA may be actuated and as many individual circuits may be connected into service.

Attention is particularly directed to bank 2 of selector SE1. It will be observed that terminals 0 to 11 inclusive of this bank have no connections thereto. Terminals 12 to 21 of this bank are multipled together. When the arm of bank 2 engages its terminal 12, a circuit is established from battery through the rotatable arm of bank 2, terminal 12, contact *a* associated with magnet M1 and the winding of relay ST1 to ground operating relay ST1. The operation of relay ST1 establishes a circuit from battery through the contact of relay ST1 and the winding of magnet M1 to ground energizing magnet M1. Magnet M1 thereupon opens its contact *a* releasing relay ST1. The release of relay ST1 disconnects battery which was supplied through the contact of relay ST1 to the winding of magnet M1, thus deenergizing magnet M1. Magnet M1 upon being deenergized steps the rotatable arms of selector SE1 to contact 13 and permits contact *a* of magnet M1 to reclose. When the rotatable arm of bank 2 of selector SE1 engages contact 13 of its associated bank, battery will again be furnished through the rotatable arm of bank 2 of selector SE1, contact 13 of the bank, contact *a* of magnet M1 and the winding of relay ST1 to ground reoperating relay ST1. The reciprocating action of relay ST1 and magnet M1 steps all of the arms of selector SE1 from terminal 12 to terminal 21 and then to terminal 0. When the rotatable arm of bank 2 reaches terminal 0 on bank 2 the reciprocating action is stopped and selector SE1 is in position to start a new cycle.

As the rotatable arms of selector SE1 are being rotated, when the arm associated with bank 1 engages terminal 21 of this bank, a circuit is established from battery through arm 1, contact 21, and the winding of magnet M2 to ground energizing magnet M2. Magnet M2 like magnet M1 does not step its rotatable arms upon being energized. However, when the arm associated with bank 1 of selector SE1 steps off contact 21, magnet M2 is deenergized. At the start of a weekly cycle the rotatable arms associated with the banks of selector SE2 are in engagement with their respective contacts 0 and remain in this position during the first twelve-hour period. Now, however, at the end of the first twelve-hour period each arm is stepped to engage its respective contact 1.

During the interval from noon until midnight of Sunday, for instance, relays PM1 to PM8 inclusive, which correspond to relays AM1 to AM8, inclusive, are operated in the same manner as are relays AM1 to AM8. That is to say, relay PM1 and PM5 are operated during the first fifteen-minute period of the first hour of this period. Relays PM2 and PM6, PM3 and PM7, PM4 and PM8 are operated during the second, third and fourth fifteen-minute period of the first hour after 12 noon, for instance. The circuits which perform these functions may be traced from negative battery through contact 12, for instance, associated with cam 2, dry rectifiers 81 and 82 in parallel, windings of relays PM1 and PM5 in parallel, conductor C91, PM terminal group PMT and terminal 1 and the rotatable arm of bank 5 of selector SE2 to ground operating relays PM1 and PM5. The operation of relay PM1 establishes a circuit from ground through contact 1 of key B, the rotatable arm and terminal 0 of bank 5 of selector SE1, one of 12 conductors in cable C90, contact 1 of relay PM1, and conductor E1, which extends through cable C96, to terminal 0 of terminal strip TSC. From this point a connection is made to a group of terminals connected in parallel and from each of these to the winding of a relay corresponding to relay LSA. A circuit may also be traced from ground through contact 2 of key B, rotatable arm and terminal 0 of bank 6 of selector SE1, one of 12 conductors in cable C92, contact 1 of relay PM5 and conductor N1, which is one of 48 conductors in cable C98, to terminal 0 of terminal strip TSF. From this terminal a connection is made to a number of terminals in parallel and each of these connects individually to a terminal corresponding to terminal 73 to perform the unlocking function for a relay such as relay LSA as described in the foregoing. As the timing motor continues to run, ground, for disconnecting circuits during the p.m. period, will be connected during each following fifteen-minute interval of the first p.m. hour to punchings 2Q, 3Q and 4Q of terminal strip TSE and, in a manner which should be understood from the foregoing, to corresponding terminals on each of the other 11 rows on terminal strip TSF. Selector SE1 will be stepped at the end of the first hour following noon in a manner which should be understood from the foregoing and throughout the period at hourly intervals until midnight. At the end of this time the rotatable arms of selector SE2 will be stepped to engage their next succeeding terminals.

At midnight Sunday night, for instance, the self-stepping arrangement controlled by bank 2 of selector SE1 again goes into operation in the manner described to reset the arms of selector SE1 to engage their respective terminals 0 and responsively the arms of selector SE2 are rotated to engage terminal 2 on their respective banks. The circuit continues to operate in this manner for all of the remaining days of the week. Since the selector bank numbering starts at 0, and selector SE2 moves every 12 hours, the arms of selector SE2 will be in engagement with their respective terminals 13 during the last 12 hour cycle of each week. Reference to bank 2 of selector SE2 shows that terminals 14 to 21 are connected in multiple. When the arm of bank 2 of selector SE2 is stepped from terminal 13 to terminal 14 at midnight of the seventh day of the week, a self-stepping circuit, comprising relay ST2 and magnet M2 of selector SE2, is set into motion and operates in the same manner as the self-stepping circuit of selector SE1. The arms of selector SE2 are rotated rapidly and in unison until they engage their respective bank terminals 0. Selector SE2 is now in position to start timing another week.

Attention is now called to an important feature of the invention. In the case of certain circuits selectable by the present circuit, as mentioned, selection for service or for the performance of other functions is not required every day. These functions may be required to be performed regularly once a week for instance at a certain time in a particular day of the week. Alternatively they may be required to be performed at a certain time on a number of days of the week. The present circuit facilitates such operation in the following manner.

It was shown in the foregoing that battery, for instance, is supplied for the operation of the relays such as relay LSA through contacts *a* to *h* of relay EXA. The circuits are separated into groups by extending them through separate contacts to distribute the load and to permit proper protective fusing arrangements. The control of the operation of relay EXA as arranged on the drawings is by means of bank 4 of selector SE2 which may supply ground for its operation through its rotatable arm and any of its bank terminals from 0 to 13. The flexibility in the choice of days on which a function is performed is afforded by providing a separate relay such as relay EXB for every group of selectable circuits which are to be selected on the same day or days and wiring them to the required terminals on banks 4 or 6 of selector SE2. For instance, if a group of circuits were required to be operated on Monday only, an individual relay, such as relay EXA or EXB would be provided for the group, and the winding of the individual relay would be connected to the particular terminals on bank 4 of selector SE2 to which ground was supplied only on Monday. If a group of circuits were required to be operated on five days of a week, Monday through Friday, for instance, an individual relay such as relay EXA or EXB would be supplied for such a group. The terminals on bank 6 of selector SE2 assigned to the days from Monday through Friday would be connected in parallel and to the winding of the relay corresponding to relay EXA or EXB assigned to the group.

The vertical row of lamps shown at the left in Fig. 1 are provided to afford an indication of the position number of the terminal with which the arms of selectors SE1 and SE2 are in engagement at any time. An individual lamp is provided for each significant position on each bank. Battery is supplied through the rotatable arm and numbered terminals 0 through 11 of bank 3 of selector SE1 and through the filament of an individual lamp for each of the 12 terminals to ground. Each lamp is numbered to indicate the hour corresponding to the position of the terminal. Bank 1 of selector SE2 is arranged to connect battery selectively through its rotatable arm and terminals 0 to 13 and the filament of an individual lamp for each terminal to ground. These 14 lamps, two for each day of the week, for instance, are designated to indicate the particular day and a.m. and p.m. period.

Key A in Fig. 2 is provided so that the circuit to the stepping magnet M1 of selector SEL1 may be opened to disable the selector, for maintenance. Selector SE2 is operated through selector SE1 and thus when selector SE1 is disabled selector SE2 is also available for maintenance.

Key B in Fig. 1 is likewise provided for maintenance purposes. When key B is activated to its alternate position the relays such as relays LSA and LSB are prevented from operating and thus are available for maintenance. Similarly the keys such as key TKA and TKS in Fig. 3 are provided for maintenance purposes. When they are in positions shown the associated LSA and LSB relays cannot be operated. When the keys are actuated to close their lower contacts the relays such as relays LSA and LSB are operated in the manner described. When keys TKA and TKB are actuated to close their upper contacts relays such as relays LSA and LSB are under manual control. That is to say operation of these keys to their upper contacts operates the associated relays directly over a path which, for relay LSA, may be traced from battery through resistor TKS, contact *a* of key TKA, bottom winding of relay LSA and contact *b* of key TKA to ground operating relay LSA. When key TKA is restored relay LSA releases. Lamps L2, L3, L4, L5 and L6 are lighted over obvious circuits when contacts 12, 13, 14, 15 and 16, respectively, are closed to facilitate checking proper operation of the relays of Fig. 2.

What is claimed is:

1. A public utility central service station having a timed selecting system for effectively connecting a line from a patron's premises to the service station for service at fixed intervals at times designated by the patron, said selecting system comprising a time control, cycling means responsive to said control, a selecting circuit responsive to said cycling means, a first and a second selectable element responsive to said selecting circuit, a first means in said circuit, responsive to said cycling means, for selecting said first element once per cycle of said cycling means, a second means in said circuit responsive to said cycling means for selecting said second element once per *n* cycles of said cycling means, where *n* is any integer greater than one, said first element being a winding on a relay, said second element being a contact on said relay, a second relay, a circuit path extending through said contact and a winding on said second relay, to actuate said second relay, to connect said line to said central station for service responsive to said selection of said second element.

2. A selecting system for controlling the period of customer usage of public utility services, said system comprising a selecting circuit, a timer for actuating said circuit, selecting elements in said selecting circuit responsive to said timer for automatically actuating said selector at a first and a second time to make said services available to a first and a second service user at said first and said second times, and means in said circuit, responsive to said timer, for automatically actuating said selector to discontinue said services at a third and a fourth time.

3. A selecting system for controlling the period of customer usage of public utility lines, said system comprising a selector circuit, a timer for actuating said circuit, a first and a second plurality of said lines, first-selector devices in said circuit, responsive to said timer, for starting usage of said first and second lines at a first and second time, respectively and second selector devices in said circuit, responsive to said timer, for terminating usage of said first and second lines at a third and fourth time, respectively.

4. In a communication switching system, a telegraph service usage timing system comprising a timing selecting circuit at a control station and a plurality of communication circuits extending from said control station to outlying subscriber stations, said selecting circuit comprising a timing motor, a selector mechanism having a plurality of switch banks responsive to said motor, a set of cam driven contacts responsive to said motor, means in said cams for actuating said contacts in a timed sequence, a plurality of relays jointly responsive to said switch banks and said cams so as to actuate said relays at predetermined intervals to connect and disconnect said communication circuits at any desired time.

5. In a telegraph switching system, a central telegraph station, telegraph lines thereat, a first, second and third group of telegraph circuits, incoming from subscriber stations, connectable to said lines at said central station, a selecting circuit at said central station having means therein for selectively connecting and disconnecting said circuits from said lines, a twenty-four hour timing device and a weekly timing device, both at said control station, means interconnecting said twenty-four hour and weekly timing devices and said selecting circuit for automatically connecting said first, second and third group of circuits and said lines at a first, second and third time, respectively, during a twenty-four hour interval of any day of the week and other means, interconnecting said timing device and said selecting circuit, for automatically disconnecting said first, second and third group of circuits from said lines at a fourth, fifth and sixth time, respectively, during any twenty-four hour interval of any day of the week.

6. A public utility usage system having a service source, a plurality of service outlets, an outlet selector connector having means for selectively connecting said outlets individually to said source, an outlet selector disconnector having means for selectively disconnecting said outlets individually from said source, a timer, a twenty-four hour cycling circuit, a weekly cycling circuit and means, interconnecting said timer, said twenty-four hour cycling circuit, said weekly cycling circuit, said selector connector and said selector disconnector, for selectively connecting and selectively disconnecting any of said outlets to and from said source at predetermined times on each day of the week or at predetermined times on certain days of the week.

7. A communication switching system having a central switching office, communication switching equipment in said office, a plurality of subscriber lines connected to said office, a subscriber line timer selector connector in said office having means for selectively connecting any of said lines to said communication switching equipment, a subscriber line timer selector disconnector in said office having means for selectively disconnecting any of said lines from said communication switching equipment, a timer, a twenty-four hour cycling circuit, a weekly cycling circuit and means interconnecting said timer, said twenty-four hour cycling circuit, said weekly cycling circuit said selector connector and said selector disconnector for selectively connecting and selectively disconnecting any of said lines to and from said communication switching equipment at predetermined times on each day of the week or at predetermined times on certain days of the week.

References Cited in the file of this patent

UNITED STATES PATENTS

| | | |
|---|---|---|
| 2,501,063 | Levin | Mar. 21, 1950 |
| 2,667,533 | Zenner | Jan. 26, 1954 |
| 2,805,283 | Stiles | Sept. 3, 1957 |